(12) United States Patent
Coombes

(10) Patent No.: US 8,985,469 B2
(45) Date of Patent: Mar. 24, 2015

(54) FORENSIC GLOVE

(75) Inventor: Anthony Coombes, Derbyshire (GB)

(73) Assignees: BM Polyco Ltd., Enfield (GB); Anthony Coombes, Hartington, Derbyshire (GB)

( * ) Notice: Subject to any disclaimer, the term of this patent is extended or adjusted under 35 U.S.C. 154(b) by 118 days.

(21) Appl. No.: 13/812,931

(22) PCT Filed: Jul. 25, 2011

(86) PCT No.: PCT/GB2011/051404
§ 371 (c)(1),
(2), (4) Date: Jan. 29, 2013

(87) PCT Pub. No.: WO2012/013963
PCT Pub. Date: Feb. 2, 2012

(65) Prior Publication Data
US 2013/0168446 A1      Jul. 4, 2013

(30) Foreign Application Priority Data

Jul. 29, 2010   (GB) .................................. 1012692.8

(51) Int. Cl.
*G06K 19/06*      (2006.01)
*G06F 17/00*      (2006.01)
*A41D 19/00*      (2006.01)

(52) U.S. Cl.
CPC ............ *G06F 17/00* (2013.01); *A41D 19/0062* (2013.01); *A41D 19/0082* (2013.01); *A41D 2400/52* (2013.01)
USPC .......................................... 235/492; 235/375

(58) Field of Classification Search
USPC ................ 235/375, 492; 382/124, 190; 2/159
See application file for complete search history.

(56) References Cited

U.S. PATENT DOCUMENTS

| 1,382,015 A | 6/1921 | Rudolph |
| 5,281,293 A * | 1/1994 | Frame et al. .................. 156/276 |
| 2006/0041991 A1 | 3/2006 | Kim Sim |

(Continued)

FOREIGN PATENT DOCUMENTS

| CN | 2090628 | 12/1991 |
| CN | 201076034 | 6/2008 |
| CN | 201727967 | 2/2011 |

(Continued)

OTHER PUBLICATIONS

The Telegraph, Police use glove prints to catch criminals, [online], published Dec. 13, 2008. Available from http://www.telegraph.co.uk/news/uknews/law-and-order/3740688/Police-use-glove-prints-to-catch-criminals.html.

(Continued)

*Primary Examiner* — Ahshik Kim
(74) *Attorney, Agent, or Firm* — Kohn & Associates PLLC

(57) ABSTRACT

The glove suitable for use at crime scenes comprises a unitary disposable glove with an outer surface having thereon machine readable indication enabling a glove bearing such an indication to be distinguished from a glove not bearing such an indication, such indication being provided on at least a palm portion and grip portions of the tips of four fingers and a thumb of the glove. The gloves are useful in a method of investigating a crime scene, wherein crime scene operatives don the gloves for handling items at the crime scene, and items at the crime scene are then machine read to identify prints thereon made by gloves of the crime scene operatives.

16 Claims, 1 Drawing Sheet

(56) References Cited

U.S. PATENT DOCUMENTS

2007/0192927 A1    8/2007   Skelton
2010/0192280 A1*   8/2010   McClard et al. ............... 2/161.8

FOREIGN PATENT DOCUMENTS

| JP | 9-209206 | 8/1997 |
|----|----------|--------|
| WO | WO2007-108777 | 9/2007 |
| WO | WO2010-007538 | 1/2010 |

OTHER PUBLICATIONS

Cop Shop UK, Crime Scene & Forensic Equipment, [online], http://www.copshopuk.com/acatalog/Scene_Of_Crime.html.

Cop Shop UK, Nitrile Foam Coated Glove—Scene of Crime, [online], http://www.copshopuk.com/acatalog/Nitrile_Foam_Coated_Glove.html.

* cited by examiner

FORENSIC GLOVE

BACKGROUND OF THE INVENTION

1. Technical Field

The present invention relates to gloves for use by forensic personnel and crime scene officers, and methods of use production and use of such gloves.

2. Background Art

There are standard techniques which are used at crime scenes that require the identification of a suspect. For example, investigating officers use various reagents, powders and chemicals to reveal and enhance latent impressions that are left by physical contact by persons at crime scenes, such techniques being frequently referred to as fingerprinting.

Since the advent of fingerprinting, burglars and other criminals have worn gloves in a bid to avoid their fingerprints being found and identified at the scene of a crime. Such gloves may be of leather, textiles, plastics such as PVC, or an elastomer such as rubber latex Any physical contact leaves a trace (Locard's law states that when A comes into contact with B a trace of B is deposited on A and a trace of A is deposited on B). All gloves leave an impression, but new latex glove impressions are quite difficult to develop when compared to fingerprints and can be easily missed; this is due to crime scene investigation (CSI) techniques being primarily aimed at developing fingerprints, because the reagent used adheres best to fingerprint grease. Development of marks left by a latex glove becomes easier when the glove's surface has become contaminated through use.

Techniques have recently been devised to make it far easier to identify individuals who leave their glove prints on surfaces. It has been shown that random elements in the manufacturing process, and subsequent wear and tear, create discernible differences between all gloves, even between those produced at the same time and using the same machinery.

These differences, which are often invisible to the naked eye, mean that, when pressed against a hard surface, each individual glove can leave a recognisable set of glove prints, based on the unique characteristics of that glove.

Glove prints can be used to prove that a particular glove was used in a crime. If the glove itself can be recovered from a suspect and its prints matched against prints taken at crime scene, this can provide valuable evidence for use in prosecution.

A database of thousands of such glove prints collected by forensic officers has therefore been collated, allowing officers to match a set of glove prints from one crime scene to those found at another such crime scene, or to a glove recovered from a suspect. See, for example, The Telegraph "Police use glove prints to catch criminals" published 13 Dec. 2008, the article being available from online sources.

However, a significant problem with the collection of glove prints at crime scenes arises because investigating officers (and others legitimately attending the crime scene) are required to wear gloves (generally thin natural rubber latex or nitrile rubber gloves) in order to avoid leaving their own fingerprints. It can therefore be difficult or impossible to distinguish the myriad of glove prints legitimately left at crime scenes from those left by the criminal.

Therefore, Applicant has devised natural rubber latex or nitrile rubber disposable gloves which can help alleviate this problem, a batch of such gloves, and also a method of producing such gloves, as well as a method of use of such gloves at crime scenes.

SUMMARY OF THE INVENTION

The present invention provides for a glove suitable for use at crime scenes including a unitary disposable glove with an outer surface having thereon machine readable indication enabling a glove bearing such an indication to be distinguished from a glove not bearing such an indication, such indication being provided on at least a palm portion and grip portions of the tips of four fingers and a thumb of the glove.

The present invention provides for a method of investigating a crime scene, wherein crime scene operatives don the gloves for handling items at the crime scene, and items at the crime scene are then machine read to identify prints thereon made by gloves of the crime scene operatives.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 2:
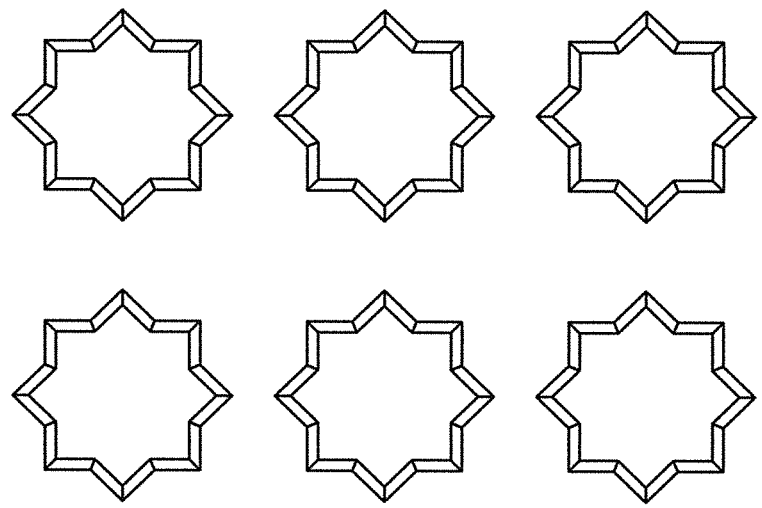
FIG. 2 shows a typical arrangement of geometrical shapes (in this case eight-pointed stars as indicated above) for covering at least the grip portion of the fingers, thumb and palm of a preferred embodiment of glove for use according to the invention.
Figure 1A:
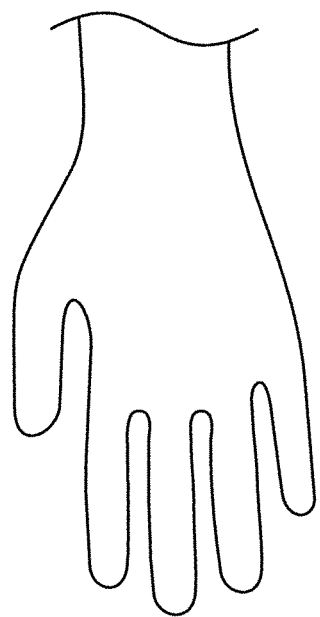
FIG. 1(A) is a plan view of a glove for use according to the invention, the glove having the entire grey area covered by machine readable indication, such as the geometrical shapes as defined above, and then by a layer of grease.
Figure 1B:
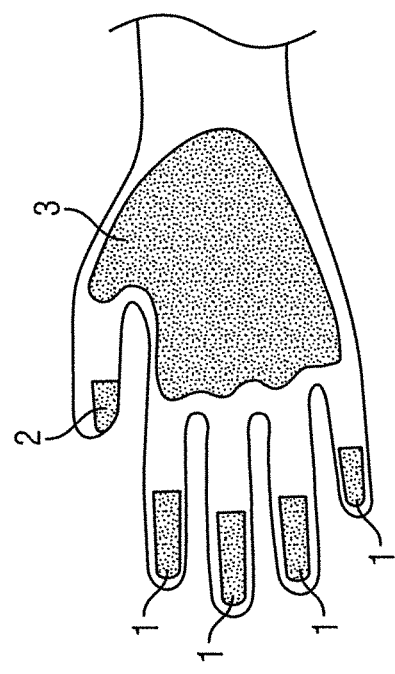
FIG. 1(B) is a plan view of a glove for use according to the invention having the grey areas of respectively the grip portions 1 of the four fingers, the grip portion 2 of the thumb, and the grip portion 3 of the palm covered by machine readable indication and the layer of grease.

According to one aspect of the present invention there is provided, for forensic use at a crime scene, a glove comprising: a unitary disposable glove having an outer surface having thereon machine readable indication enabling a glove bearing such an indication to be distinguished from a glove not bearing such an indication, said indication being provided on at least a palm portion and grip portions of the tips of four fingers and a thumb of the glove, the outer surface and the machine readable indication being optionally coated by a thin layer of oleaginous material (or grease).

The glove is typically of a polymeric material, such as a rubber or vinyl material, and is generally in the form of a stretchable cured dipped article, free of pinholes, seams or the like.

Gloves with indicia on surfaces thereon are known for other purposes, such as to enhance grip or visibility, or to provide information about the nature of the relevant glove. We are not aware of any previous suggestion to use indicia or other machine readable indications for the purpose of identifying an authorised forensic glove used at a crime scene or the like.

The optional layer of oleaginous material is designed to be of a consistency and thickness similar to the grease or sebaceous fluids found naturally on fingers and palms. Such oleaginous material would not be apparent to the wearer and not affect the grip of the glove, which would remain similar to that of a hand. Because of the forensic application of the glove, the oleaginous material is preferably DNA free and/or invisible to the naked eye. Preferred such oleaginous materials include petroleum (typically in the form of a grease or jelly) or a viscous silicone material.

The machine readable indication may comprise an indicator material (such as a detectable chemical, or an optically detectable luminophore, such as a fluorophor or phosphor) and/or an array of detectable formations provided on the outer surface of the glove for use according to the invention. In addition to being machine readable, the indication is generally easily readable by the naked eye.

Such detectable formations may comprise a multiplicity of protrusions integral with the glove, the protrusions covering at least a palm portion and grip portions of the tips of four fingers and a thumb, the protrusions all being substantially identical machine readable geometrical shapes having at least three straight edges.

Such machine readable geometrical shapes are generally all substantially of the same size and shape. The geometrical shapes therefore form three-dimensional indicia (or identifiable shaped features), whereby marks or prints made by operatives wearing gloves bearing the indicia are distinguishable from those made by persons wearing gloves not bearing such indicia, by machine readers (for example, by optical readers or the like) or by using the naked eye.

The geometrical shapes forming the indicia are preferably spaced from one another (that is, non-abutting or non-contiguous), preferably in such a manner that there is not sufficient clearance between adjacent ones of the shapes to receive a further one of the geometric shapes.

The geometrical shapes may be provided uniformly at predetermined intervals over the palm portion and the respective grip portions. Alternatively, they may be arranged in a predetermined regular pattern over the palm portion and the respective grip portions.

It should be emphasised that the geometrical shapes forming the preferred machine readable indications are formed integrally with the outer surface of the glove and are not post-formed in or on the surface and are not coated on the surface.

The geometrical shapes provided on the preferred glove according to the invention are preferably in the form of polygons, which may be regular (which is preferred) or irregular. It is particularly preferred that such polygons has an axis of rotational symmetry, and preferably a plurality of lines of reflectional symmetry. It is further preferred that the geometrical shapes have one or more obtuse internal angles, as such shapes are more readily distinguishable by machine readers. It is further preferred that the geometrical shapes have at least five straight sides.

An especially preferred geometrical shape is a regular hexadecagon in which alternate internal angles are obtuse. Such a shape may be described as an eight-pointed star shape, though star shapes with other numbers of points, such as five or six, may also be employed.

The outer surface of each of the geometrical shapes is preferably substantially flat and/or substantially parallel to the surface of the respective palm or grip portion, so as to form a plateau spaced from the respective palm or grip portion. The transition between the outer surface of the geometrical shape and the palm or grip portion is typically a bevelled slope or the transition can be immediate.

The machine readable indication such as the above-mentioned geometrical shapes may, in some embodiments, cover substantially all of the palm or grip face of the glove (including the inner grip faces of all four fingers and the thumb). In further embodiments, the machine readable indication may cover the entire outer surface of the glove according to the invention.

Although it is not the principal aim of the glove for forensic use according to the invention, when the preferred geometrical shapes are provided over the grip surfaces of the glove, they may advantageously provide enhanced grip, in addition to providing machine distinguishable prints at crime scenes as indicated above.

The glove for use according to the invention preferably has a thickness of 0.1 to 25 mm; when the glove has the preferred protrusions thereon, such protrusions preferably stand proud of the relevant surface of the glove by a height of about 40 micrometers.

The gloves for use according to the invention are preferably formed in one or more dipping steps to form an integral unitary body which is free of pin-holes, seams or other discontinuities over the entire surface thereof, to provide an effective barrier to contact of items at a crime scene by the skin of the operative wearing the glove.

The present invention further comprises a method of producing a glove for use according to the invention, which method comprises applying the machine readable indication thereto over at least the palm portion and the respective grip portions of the glove, and then applying the layer of the oleaginous material.

In the preferred embodiment, the glove having the layer of oleaginous material may be produced by (a) applying an elastomer (such as a latex) or plastisol containing a polymer material to a hand-shaped former provided on its surface with a multiplicity of depressions, each such depression being of the complementary geometrical shape to that of the resultant protrusions as defined above, and said depressions covering at least a palm portion and grip portions of the tips of four fingers and a thumb of the former;

(b) curing the polymer material;

(c) removing the resultant glove-shaped body from the former; and (d) applying the layer of oleaginous material to the protrusions.

The step of removal of the glove-shaped body from the former generally involves eversion of the glove, such that the latex surface which contacted the former becomes the outer layer of the glove when worn; thus the resulting glove has a multiplicity of protrusions over at least the grip areas of the glove, the protrusions being of complementary shapes to those of the depressions on the former.

When an elastomer is used to produce the glove for use according to the invention, it can be, for example, of natural or synthetic rubber. Examples of synthetic rubbers include a nitrile rubber, a neoprene rubber, polyisoprene, or a mixture or copolymer thereof; the elastomer may alternatively be a polyurethane or vinyl elastomer (such as a vinyl chloride copolymer). When a plastisol is used to produce the glove for use according to the invention, it may be of a plasticised vinyl chloride polymer or the like.

As is well known, such an elastomer latex or plastisol may include conventional additives, such as sulphur (for curing or vulcanisation), zinc oxide, organic accelerators, stabilisers, waxes, viscosity regulators, fillers, pigments, plasticisers, pigments and the like.

The method of forming the glove for use according to the invention is preferably carried out by dipping in the latex or plastisol a hand-shaped former having a multiplicity of depressions, each such depression being of the complementary geometrical shape to that of the resultant protrusions as defined above, the depressions covering at least a palm portion and grip portions of the tips of four fingers and a thumb of the former.

The former may be made of any suitable material commonly employed in the industry, such as a ceramic, metal or polymer material. The former is generally dip-coated first with a water-based, polymeric, coagulant coating before the elastomer is applied thereto, generally by dipping the former into the latex.

The glove for use according to the invention is preferably one of a batch of gloves, all having thereon the same machine readable indication as described above. If each glove in a respective batch has the same machine readable machine readable indication, it can provide forensic personnel with a way of identifying when the crime scene was accessed by operatives wearing gloves from that batch.

The present invention further comprises a method of investigating a crime scene, wherein crime scene operatives don gloves according to the invention for handling items at the crime scene, and items at the crime scene are then machine read to identify prints thereon made by gloves of the crime scene operatives. Prints made by authorised operatives can therefore be eliminated from the forensic investigations.

In a preferred embodiment, the method of investigating a crime scene comprises the following steps.

A supply of gloves is provided each comprising a unitary disposable glove of polymer material which has an outer surface having thereon machine readable indication, the machine readable indicia enabling a glove bearing such an indication to be distinguished from a glove not bearing such an indication, the indication being provided on at least a palm portion and grip portions of the tips of four fingers and a thumb of the glove.

Then, crime scene operatives don gloves selected from the supply and handle items at the crime scene while wearing the gloves.

Subsequently, items are examined at the crime scene to identify prints thereon made by gloves of the crime scene operatives used in the preceding step.

Finally, prints identified in the preceding step are eliminated.

Preferably, when a plurality of such operatives is present at the same crime scene, each such preferably operative dons a pair of gloves (one for each hand), the gloves so donned being selected from a batch of gloves according to the invention, as described above. Such a batch of gloves may be provided in a dispenser, typically to be worn on a belt or other item of clothing of the relevant operative.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A method of investigating a crime scene, which comprises:
   (a) providing a supply of unitary disposable forensic gloves, each said forensic glove:
      (i) being of an elastomer or of a vinyl polymer,
      (ii) having a palm portion, a back portion, four fingers and a thumb, and
      (iii) having an outer surface on at least the palm portion and of grip portions of the tips of four fingers and a thumb of the glove which outer surface bears an array of detectable formations enabling a glove bearing such formations to be distinguishable from a glove not bearing such formations;
   (b) employing crime scene operatives to each don said forensic gloves for respective hands for handling items at the crime scene; and
   (c) machine reading items handled at the crime scene to identify glove prints on said items made by gloves of the operatives used in step (b); and
   (d) eliminating from further investigation glove prints identified in step (c) as being made by gloves of the operatives employed in step (b).

2. A method according to claim 1, wherein the outer surface and the detectable formations have applied thereto a thin coating layer of oleaginous material.

3. A method according to claim 2, wherein the oleaginous material is invisible to the naked eye.

4. A method according to claim 2, wherein the oleaginous material is free of DNA.

5. A method according to claim 1, wherein the array of detectable formations comprises a multiplicity of protrusions integral with the glove, the array covering said palm portion and said grip portions of the tips of said four fingers and thumb, the protrusions all being substantially identical machine readable geometrical shapes having at least three straight edges.

6. A method according to claim 5, wherein said shapes are all of the same size.

7. A method according to claim 5, wherein said shapes are spaced from one another in such a manner that there is not sufficient clearance between adjacent ones of the shapes to receive a further one of the geometrical shapes.

8. A method according to claim 5, wherein said geometrical shapes are disposed at predetermined intervals over at least said palm portion and respective grip portions.

9. A method according to claim 5, wherein said geometrical shapes are arranged in a predetermined regular pattern over at least said palm portion and respective grip portions.

10. A method according to claim 5, wherein said geometrical shapes are polygons.

11. A method according to claim 10, wherein said polygons have an axis of rotational symmetry.

12. A method according to claim 10, wherein said polygons have a plurality of lines of reflectional symmetry.

13. A method according to claim 5, wherein the geometrical shapes have one or more obtuse internal angles.

14. A method according to claim 5, wherein the geometrical shapes each have at least five straight sides.

15. A method according to claim 1, wherein the forensic gloves have a thickness of up to 25 millimeters.

16. A method according to claim 1, wherein each of the forensic gloves is a stretchable cured dipped rubber article.

* * * * *